United States Patent [19]

Thiele et al.

[11] 4,407,412
[45] Oct. 4, 1983

[54] PLASTICS SPOOL CONTAINER FOR MAGNETIC TAPES

[75] Inventors: Hartmut Thiele, Munich; Dieter Schmelter, Poecking; Rainer Posch, Munich, all of Fed. Rep. of Germany

[73] Assignee: Agfa-Gevaert Aktiengesellschaft, Leverkusen, Fed. Rep. of Germany

[21] Appl. No.: 274,821

[22] Filed: Jun. 18, 1981

[30] Foreign Application Priority Data

Jun. 26, 1980 [DE] Fed. Rep. of Germany ....... 8016911

[51] Int. Cl.³ .................... B65D 85/02; B65D 45/06; E05C 3/12
[52] U.S. Cl. .................................. 206/404; 206/303; 220/324

[58] Field of Search ............... 206/404, 403, 405, 406, 206/303; 220/324, 325, 315; 70/63; 292/202, 204, 209

[56] References Cited

U.S. PATENT DOCUMENTS

| | | | |
|---|---|---|---|
| 165,005 | 6/1875 | Knorp | 292/202 |
| 3,169,682 | 2/1965 | Hollingsworth | 206/404 |
| 3,417,894 | 12/1968 | Gittler | 206/404 |
| 3,612,233 | 10/1971 | Nagpal | 206/403 |

Primary Examiner—Joseph Man-Fu Moy
Assistant Examiner—Brendad Ehrhardt
Attorney, Agent, or Firm—Connolly and Hutz

[57] ABSTRACT

Plastics spool container for magnetic tapes, in particular video tapes provided with a handle being moulded on one half of the housing, a closure mechanism at the front and a one-armed locking toggle to secure the closure mechanism.

2 Claims, 4 Drawing Figures

U.S. Patent  Oct. 4, 1983  Sheet 1 of 2  4,407,412
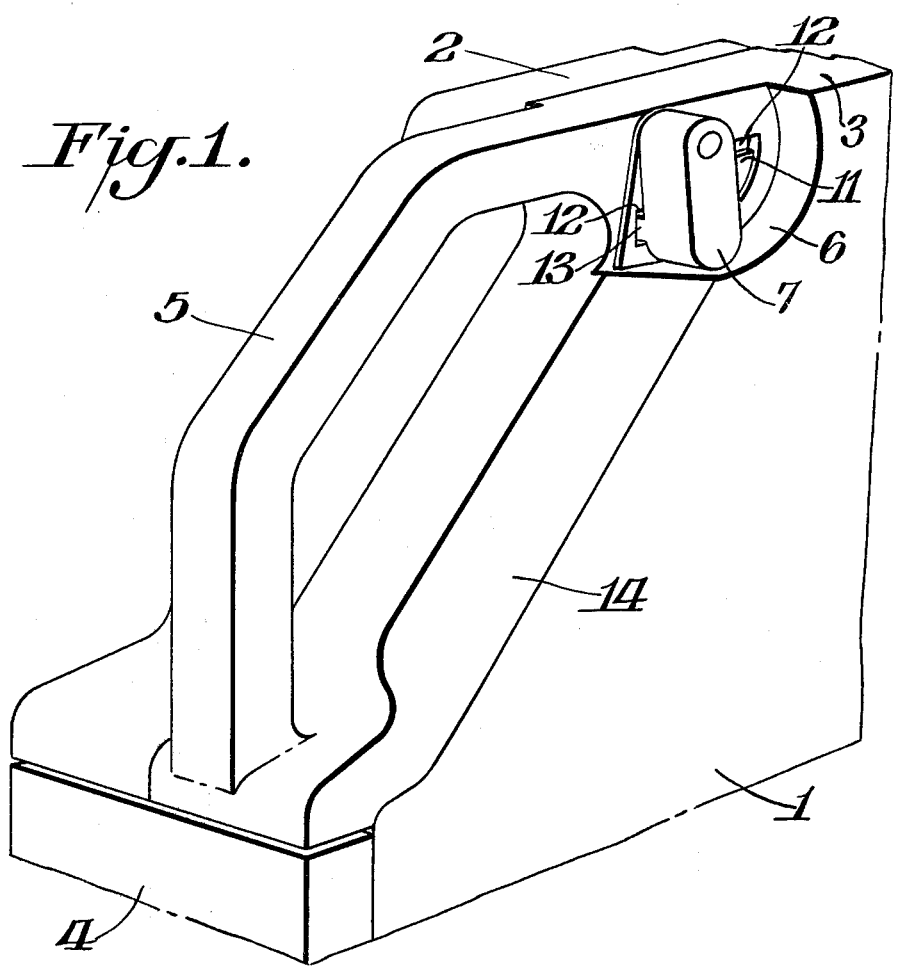
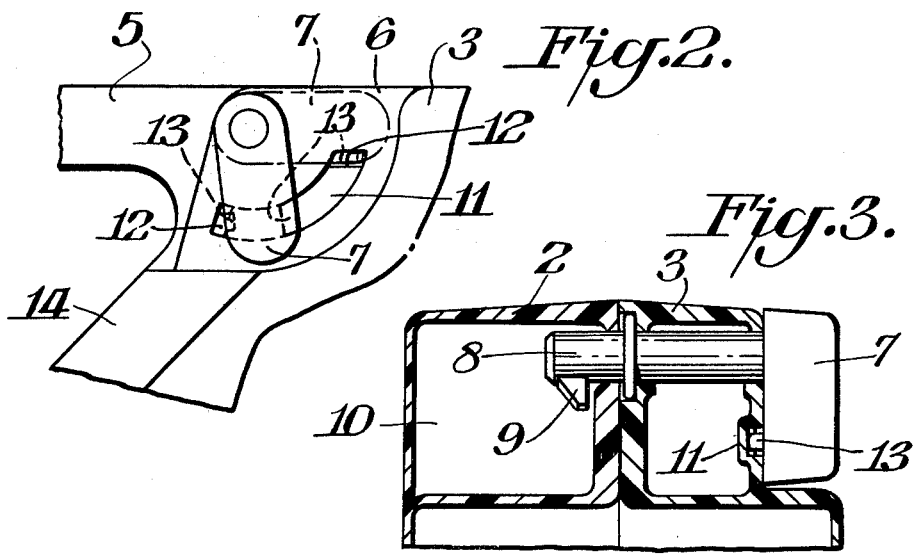
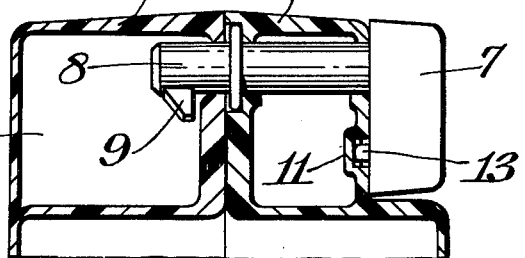

PLASTICS SPOOL CONTAINER FOR MAGNETIC TAPES

The invention relates to a plastics spool container for magnetic tapes, in particular video tapes, in the form of a box, in which the handle is moulded on one half of the housing.

The following requirements have to be met in packagings, in particular for video tapes during transportation. The reel of magnetic tape must be packed in a shock-proof manner and protected from dust, the closure mechanism should be protected from vibration and, not least, the container should be light and inexpensive to produce. Recently, transportation containers of this type have been produced from plastics. Blown hollow bodies made of polypropylene have proven particularly suitable. Transportation containers of this type are usually locked by means of a centrally arranged closure mechanism which is operated by a rotatable handle and is brought into engagement with the locking means of the other part of the container through the spool hub. In addition to central closure mechanisms, there are several locking levers which are mounted at the individual corners of the container and thus increase the dust protection. Catch and clamping levers as well as slide devices which, for reasons of production are produced from the same plastics material as the containers, are also used. During transportation, it is possible for simple snap levers and locking slides to open due to inexpert handling and thus cause damage to the material and the container.

An object of the invention is to overcome these defects by creating a spool container which meets the requirements mentioned at the outset and is provided with a simple safety device for transportation, which prevents unintentional opening of the box and at the same time increases the protection afforded to the contents of the box from moisture and dust.

The object is achieved according to the invention by means of a spool container, in particular for video tapes, consisting of a bottom case and a covering case which can be folded by means of hinges and are provided at the front with a closure mechanism and a handle which is located on the covering case and extends from the front to the upper side of the cover, a one-armed locking toggle, which is pivotal in a segment-shaped cavity and can be non-positively locked and unlocked in an opening in the interior of the bottom case by means of its barbed peg which engages in the covering and bottom case, being mounted on the transition from the handle to the upper side of the covering case. Other particulate relating to the container according to the invention are disclosed in the description, the drawings and the claims.

An embodiment of a plastics container according to the invention is described in more detail with reference to the drawings.

FIG. 1 shows an oblique perspective view of the container.

FIG. 2 shows a fragmental side elevational view of the container in the region of the transporting safety device.

FIG. 3 shows a sectional view of the locking lever as seen from the front toward the rear of FIG. 1.

Figure 4:
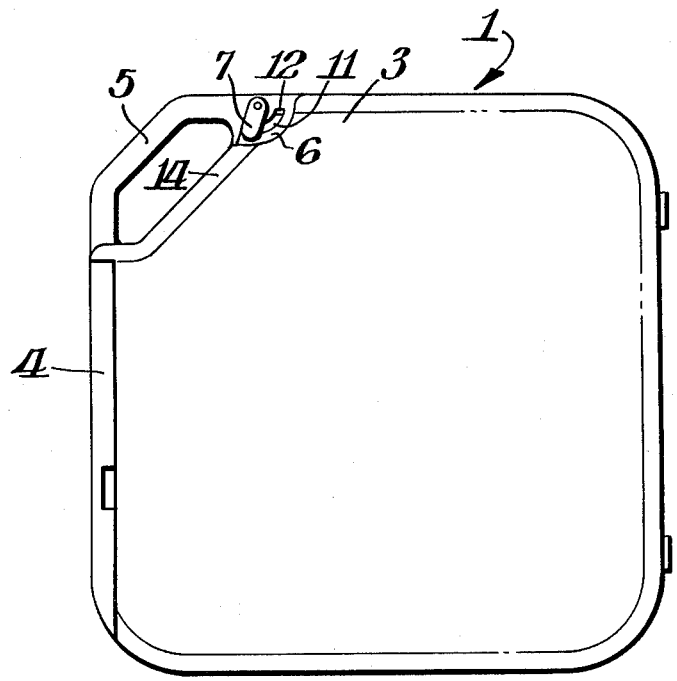
FIG. 4 is a side-elevational view of the container

A plastics container (1), which can be folded open by means of hinges, and is preferably produced by a blowing method, and a part of which is shown in FIGS. 1 and 2, has a bottom case (2) and a covering case (3) for receiving a magnetic tape wound on to a spool. A sliding lock (4), which obviously can be replaced by a different closure mechanism, for example a snap closure, is located on the front. The corner of the container above the lock is bevelled and is spanned on the inner half of the covering surface by a handle 5. A segment-shaped cavity (6) half-way into the width of the cover, which receives an extra transportation safety device, is located at the transition from the handle to the covering case. The device consists of a one-armed locking toggle (7) which can pivot through 90° and, as shown in FIG. 3, passes through the other cover region by means of a peg (8) and can be locked in a hole with a recess in the housing (10) by means of a barb (9). An arc-shaped groove (11) having indentations (12) at each end runs in the lateral wall of the cavity. The locking toggle bearing projection 13 at one side of its free end engages in these indentations as it pivots through 90°. The barb of the locking toggle and the opening for insertion of the barb at the hole in the bottom portion of the container are adapted to each other in such a way that the locking lever can be locked in the vertical position and unlocked in the horizontal position. As the locking toggle is integrated into the face of the box and is arrested in the indentations in the groove, the box cannot be unlocked during transportation as a result of careless handling and other vibrations. The non-positive lock also pushes the two halves of the box together closely and seals the box so that the contents are protected from the admission of dust and moisture. The covering surface is slightly bevelled (14) toward the toggle to allow for a better grip of the locking toggle as the box is being opened.

We claim:

1. A container for magnetic tapes having at least two parts hinged together comprising
    a bottom case part having a housing portion of the bottom case part
    a covering case part foldably connected to said bottom case part by hinging means and disposed to provide a closed container in the folded-together position,
    said container in closed position having a narrow front side and another adjacent narrow side and said container being formed to provide a handle at a corner between the front and said adjacent narrow side,
    a segment-shaped cavity formed in said container which is adjacent to both said handle and said adjacent narrow side, having a lateral wall of said cavity,
    a groove formed in said lateral wall and indentations formed within said groove and in said lateral wall,
    a hole opening into a recess formed in the housing portion of the bottom part,
    so constructed and arranged that,
    when said parts are folded into closed position, said lateral wall is adjacent to the hole opening in the recess formed in the housing portion of the bottom case part,
    a locking toggle having a peg member which is mounted in said lateral wall and extends into said hole opening into said recess formed in the housing portion of the bottom case part, a single arm of said toggle pivotally mounted on an end of the peg and pivotable between a first and a second toggle position, a projection formed on said arm to be positioned in said grooves and engage said indentations, said projection engageable in said indentations in the respective first and second toggle positions, a barb on the end of the peg opposite the single arm insertable through the hole opening into said recess, said barb and recess being adapted to each other so that the barb engages the housing in one of said positions, whereby the barb and the housing on the bottom case by engagement of the barb with the bottom case part and the arm with the covering case part pushes the bottom case part and the covering case part, respectively closely together with the locking toggle arrested by engagement of the projection and an indentation.

2. A container as claimed in claim 1, wherein said arm of the locking toggle mounted in the lateral wall container at one end of the peg, is provided on one side of its free end with a projection and the lateral wall is formed with a curved groove, said projection running in the curved groove.

* * * * *